Patented Dec. 19, 1933

1,940,613

UNITED STATES PATENT OFFICE 1,940,613

PROTECTIVE COATING COMPOSITION

Charles A. Thomas, Dayton, Ohio, assignor, by mesne assignments, to Dayton Synthetic Chemicals, Inc., Dayton, Ohio, a corporation of Ohio No Drawing. Application February 16, 1931
Serial No. 516,216

9 Claims. (Cl. 134—26)

This invention relates to protective coatings such as paints, varnishes, and the like, and to driers for use in protective coating materials.

One of the principal objects of the invention is to provide a protective coating material of this character which is of good quality, highly durable, rapid drying, and which dries to a smooth film.

Another object of the invention is to provide a material for use in a protective coating containing a drying oil such as tung oil, which prevents the occurrence of the phenomenon known as crystallizing, during drying of such oil film.

Another object of the invention is to produce a drier composition which prevents crystallization of a coating film during drying, and which accelerates the drying of such films to a degree comparable to that obtained by the use of ordinary metallic driers.

Another object of the invention is to provide a method for producing coating materials and drier compositions of this character.

Other objects and advantages of this invention will be apparent from the following description and the appended claims.

It has long been observed by paint and varnish makers that thin films of tung oil, sometimes referred to as China-wood oil, or of coating materials containing such oil, may on drying, produce an effect known as "crystallizing." That is, instead of the usual smooth, glossy surface characteristic of dried paint or varnish films, the surface of the film has a crystalline structure sometimes described as "crystal rosettes." Such a crystallized surface is obviously undesirable in many types of coating material, the film being less durable and more susceptible to attack by various agencies, as well as lacking the smooth polished finish usually desired in such coatings. The cause of this phenomenon is not completely understood, although tests have shown that the effect is most pronounced when the film is dried in an oven where the atmosphere is poor in oxygen, and that such a condition results where the film is dried in the presence of a burning flame.

Before use in coating materials, tung oil is usually subjected to a so-called "bodying" process, which comprises heating the oil to approximately 230° C. to 320° C. until the desired body or consistency is obtained. Tung oil bodied in this manner, still produces a crystallized film on drying, especially under certain conditions as described above. If in bodying tung oil the heating of the oil is continued for a longer time or to a higher temperature, the oil solidifies or "jells"; so that it cannot be held at temperatures such as indicated, for any appreciable length of time. However, when certain natural gums which are acid in character, or acid resins or other acid forming compounds, are added to tung oil, jelling of the oil is retarded, and the oil can be heated at temperatures of from 230° C. to 320° C. for a period of time, for example about twenty minutes, without jelling. After such treatment the oil loses the property of crystallizing on drying, and with the addition of metallic driers, will dry to form a smooth glossy film. This is the method usually followed in preparing tung oil for protective coatings. Such long heating, however, tends to produce darkened materials, and also the oils so treated have a retarded rate of drying. Moreover, when neutral or non-acidic resins are used with tung oil in coating materials, such resins do not retard jelling of the oil, and the oil cannot be held at a high temperature without jelling, sufficiently long to prevent crystallization on drying of the film. The addition to the oil of any material which retards jelling of the oil, such as acid-forming compounds, is objectionable because of the tendency to darken the finished product, and to retard the drying rate as stated above, and also to make the film less durable. Certain materials have been found to have the property of preventing crystallization when added to tung oil, but drying of the film is so greatly retarded as to render its use impractical.

It has been discovered that phenols and chlorphenols, such as phenol, cresol, beta-naphthol and chlor-phenol, tend to decrease or prevent crystallization of a film of tung oil, or coating materials containing tung oil. Where it is necessary to use relatively large proportions of metallic drier, the resulting films may also be objectionably brittle and lacking in durability. It has been found, however, that when certain phenols, such as phenol, beta-naphthol and chlor-phenol, are incorporated in metallic driers to form a novel composition, and the resulting drier composition is then used in coating materials such as paints or varnishes, crystallization during drying of the film is effectively prevented, while at the same time the rate of drying of the film is not materially reduced, and the film is satisfactorily durable. In this manner, a non-crystallizing, fast-drying coating material may be produced.

It is known that phenols such as beta-naphthol, chlor-phenol, and the like, when added directly to a drying oil to be used in a coating material or varnish, have an inhibiting effect upon the oxidation of the varnish film, such that it has heretofore been considered impractical to use such materials in coating compositions in this manner. But I have discovered that when a phenol such as beta-naphthol is first formed into a drier composition with metallic driers and certain solvents which are miscible with drying oils, and which are solvents for both the metallic drier and the phenol, then objectionable retardation of the drying rate of a coating film is overcome by employing such drying composition with the coating material. The film thus formed dries at substantially the accelerated rate produced by ordinary metallic driers on heretofore used coating compositions in which such phenols are not used. Thus by this invention, the danger of crystallization of the film is overcome and a smooth coating film is produced, which dries at a commercially satisfactory and rapid rate.

For example, by use of a drier composition including beta-naphthol incorporated in a metallic drier, tung oil may be used in production of coating materials with any type of resin, and the film from such coating materials does not crystallize even under severe conditions such as described above. By use of beta-naphthol in this manner, prolonged heating of tung oil is rendered unnecessary. That is, when a drier containing beta-naphthol incorporated therein, is used in a paint or varnish in the usual manner, the tung oil or other drying oil or mixture of drying oils used need be subjected only to the heat required for the simple bodying processes, and such coating materials will be entirely free from crystallization on drying of the film. The dried film is also found to be less brittle and consequently more durable than is the case when the oil has been heated for longer periods of time according to the now prevalent practice in the use of tung oil with acidic materials.

It is also found that when phenol or chlor-phenol is combined with beta-naphthol and incorporated in a metallic drier and used in coating materials, such as varnishes, crystallization of the dried film is effectively prevented, and the color of the material or film is materially lighter than when beta-naphthol alone is used. Consequently, for certain purposes, a mixture or composition of beta-naphthol and a material which inhibits darkening of the film on drying, such as phenol or chlor-phenol, incorporated in a metallic drier, is found desirable.

This drier composition of mixed metallic drier and inhibitor of crystallization may be prepared and shipped commercially in the dry form if desired. But before use or addition to the coating material it is first placed in solution in order to facilitate its addition to, and uniform and homogeneous distribution within, the coating material. Various organic solvents which are miscible with drying oils and which are effective to dissolve the metallic drier and the inhibitor in sufficient concentration may be used, such for example as butyl alcohol, denatured ethyl alcohol, amyl alcohol, mineral spirits, solvent naphtha, benzol, toluol, and the like. A mixture of solvents is often found desirable for this purpose, particularly when the solubility of the metallic drier or inhibitor in one solvent is not sufficient to give the concentration desired. A convenient method of preparation of the drier composition resides in separately dissolving the metallic drier in a solvent which is particularly suitable for this material, dissolving the inhibitor in another solvent especially suitable for such inhibitor, and miscible with the first solvent, and then mixing the two solutions.

In making a drier in accordance with this invention, any of the usual metallic driers, such as resinates, linoleates and sulphonic acid salts of naphthalene and its homologues known as soligen driers, of metals such as cobalt, lead, manganese, iron, cerium and vanadium, or mixtures of such driers, may be used. The proportion of the solvent to solid materials, that is, metallic driers and beta-naphthol, or chlor-phenol, or a mixture of these, may vary widely. It has been found, however, that at least equal proportions by weight of solvent are usually required to maintain the solid constituents in solution. It has also been found that a proportion of solvent greater than three parts solvent to one part solid constituents makes the resulting solution too dilute for convenient use as a drier. The proportion of inhibitor used in a drier varies widely with the inhibiting material and the metallic drier used. Certain inhibiting materials are found to require a larger proportion of metallic drier to produce satisfactory drying properties in the finished varnish or coating material. The accelerating properties of metallic driers also differ, and must be taken into consideration. It is also found that the proportion of inhibitor required to effectively prevent crystallization under the most severe conditions, varies widely with different inhibiting materials. Thus beta-naphthol, when used in combination with a drier, is found to be effective as an inhibitor in proportions of less than ½% by weight, proportions being based on the finished varnish, and may be satisfactorily used in proportions up to 10% or more.

It has been found that the use of 3% or more of beta-naphthol in combination with a metallic drier gives complete protection from crystallization of the varnish film and at the same time allows satisfactorily rapid drying of such film. The most desirable proportions for particular driers and solvents may readily be determined by simple test. As examples of drier compositions produced according to this invention, the following procedure and proportions have been found to give satisfactory results.

*Example 1.*—Ten parts by weight of beta-naphthol are mixed with one part by weight of cobalt resinate. This mixture of solid constituents is then added to about twenty parts by weight of butyl alcohol, and the mixture gently heated below the boiling point of the solvent with stirring, until the solution is complete. On cooling the mixture is ready for use and may be used in the manner of a japan drier, or stored and packed for distribution. When used with varnishes up to 50 gallons in length, that is a varnish in which 50 gallons of oil is combined with 100 pounds of resin, proportions of approximately one part by weight of the drier composition produced as described above to 33⅓ parts by weight of varnish are found satisfactory. For varnishes above 50 gallons in length, proportions of approximately one part by weight of drier to 25 parts by weight of varnish, are usually preferred.

*Example 2.*—16 parts by weight of beta-naphthol are mixed with one part by weight of manganese linoleate. This mixture of solid constituents is then added to about 28 parts by weight of anhydrous denatured alcohol, and the mixture gently heated with stirring, until the solution is complete. On cooling the mixture is ready for use and may be used as indicated in Example 1, in the manner of japan drier.

*Example 3.*—10 parts by weight of lead soligen drier, 1 part of manganese soligen drier and 50 parts of beta-naphthol are mixed together. This mixture of solid constitutents is then added to about 75 parts by weight of anhydrous denatured alcohol, and the mixture heated with stirring until solution is complete. On cooling the mixture is ready for use and may be used in the manner of a japan drier.

*Example 4.*—It is sometimes desirable for convenience in bringing the materials into solution, to separately mix the metallic driers and the inhibiting materials with suitable solvents for the driers and inhibitors respectively, and then combine the resulting solutions. For example, a japan drier may be made by mixing the following ingredients and stirring with gentle heating until solution is complete.

| Solution A. | Parts by weight |
|---|---|
| Lead linoleate | 18 |
| Manganese linoleate | 2 |
| Solvent, such as turpentine or solvent naphtha | 80 |

The following ingredients are then mixed in the same manner, until solution is complete.

| Solution B. | Parts by weight |
|---|---|
| Beta-naphthol | 3.0 |
| Phenol | 5.0 |
| Anhydrous ethyl alcohol | 2.5 |
| Solvent naphtha | 2.5 |

To solution B four parts by weight of solution A are added and mixed thoroughly.

On cooling the mixture is ready for use, and may be used as indicated in Example 1, in the manner of a japan drier. In the above formula, chlor-phenol may be substituted for phenol with equally good results.

These drier compositions are used with varnishes and other coating materials in the manner described in Example 1.

Driers produced according to this invention have been found particularly valuable for use with varnishes and other coating materials made from a neutral hydrocarbon resin, produced by reacting together in the presence of a metallic halide catalyst a mixture of unsaturated hydrocarbons, such as are found in cracked distillate, or from a mixture of a diolefine with an olefine, or a diolefine with a substituted benzene, or an olefine and diolefine with a substituted benzene. Such resins and methods and processes of manufacturing these resins are described and claimed in the copending applications of Charles A. Thomas and Carroll A. Hochwalt, Serial No. 294,491, filed July 21, 1928; Charles A. Thomas, Serial No. 461,807, filed June 17, 1930; Charles A. Thomas, Serial No. 482,157, filed September 15, 1930; and Charles A. Thomas, Serial No. 494,692, filed November 10, 1930. These resins are produced by reacting together the above mentioned materials in the presence of the metallic halide catalyst such as an anhydrous aluminum halide, neutralizing the reaction mixture to end the reaction, separating the catalyst from the resinous reaction product and hardening the resinous reaction product to produce a hard solid resin. The resin so produced is neutral or slightly acid in reaction, unsaponifiable, readily soluble in gasoline and petroleum oil solvents and does not retard the drying of linseed oil, and is, therefore, particularly suitable for use in protective coating materials. These resins, being neutral when free from impurities, do not retard the jelling of tung oil, and when made into coating compounds containing tung oil, and used with ordinary metallic driers, the dried film under certain conditions shows the defect above described as crystallization. However, when used with drier compositions of this invention no crystallization occurs, and the resulting film is found to be more durable and less brittle than with ordinary metallic driers, while the rate of drying is not objectionably retarded. In preparing a protective coating material such as a varnish, the drying oil such as tung oil is first bodied by heating to approximately 230° C. to 320° C. until the desired consistency or body is obtained, which occurs in a comparatively short time such as about five minutes, then a proportion of the substantially neutral hydrocarbon resin is added in solution in a suitable organic or hydrocarbon solvent in accordance with the practice in the varnish industry to give the amount of resin in the varnish for the particular use desired, the drier composition such as described above or the metallic drier and inhibitor are then added in suitable proportions such as described above. The mixture may be further thinned with organic or hydrocarbon solvent to give the consistency desired for use.

Drier compositions produced according to this invention are found to have all the desirable characteristics of ordinary metallic driers when used in coating materials made from any resin or drying oil, while at the same time such drier compositions effectively prevent crystallization of the coating film while drying.

While the methods herein described and the products so produced constitute preferred embodiments of this invention, it is to be understood that the invention is not limited to these precise methods or precise products, and that changes may be made therein, without departing from the scope of the invention which is defined in the appended claims.

What is claimed is:

1. A drier composition for use with oil-resin protective coating materials, comprising a metallic drier and a phenolic inhibitor of crystallization, the respective amounts and character of drier and phenolic inhibitor being sufficient to substantially prevent crystallization during drying of the coating film without retarding the drying rate of the coating composition in the film form.

2. A drier composition for use with oil-resin protective coating material, comprising a metallic drier in combination with beta-naphthol, the respective amounts of drier and beta-naphthol being sufficient to substantially prevent crystallization during drying of the coating film without retarding the drying rate of the coating composition in the film form.

3. A protective coating composition, comprising tung oil, a substantially neutral synthetic resin produced from petroleum, a drier, and a phenolic inhibitor of crystallization, the respective amounts and character of drier and phenolic inhibitor being sufficient to substantially prevent crystallization during drying of the coating film without retarding the drying rate of the coating composition in the film form.

4. A drier composition for use with oil-resin protective coating materials, comprising a metallic drier, beta-naphthol and phenol, the respective amounts of drier and phenols being sufficient to substantially prevent crystallization during drying of the coating film without retarding the drying rate of the coating composition in the film form.

5. A protective coating composition comprising tung oil, a substantially neutral synthetic resin and beta-naphthol, the proportion of beta-naphthol in the coating composition being sufficient to substantially prevent crystallization during drying of the coating film without retarding the drying rate of the composition in film form.

6. For use with protective coating materials containing a substantially neutral synthetic resin and a drying oil, a composition comprising a phenolic inhibitor of crystallization in a proportion more than approximately one per cent by weight, based on the finished coating material, and a metallic drier, the composition producing a normal drying rate of the coating composition in the thin film form.

7. A protective coating composition comprising tung oil, a substantially neutral synthetic resin produced from cracked petroleum distillate, and beta-naphthol in a proportion of at least approximately one per cent by weight, based on finished coating material.

8. A protective coating composition comprising tung oil and a synthetic resin produced from cracked petroleum distillate, such composition alone having a tendency to crystallize during drying of the coating film, the coating composition containing a sufficient proportion of beta-naphthol to substantially prevent crystallization during drying of the coating film without retarding the normal rate of drying in the film form.

9. A protective coating composition comprising tung oil, a substantially neutral synthetic resin produced from cracked petroleum distillate, and beta-naphthol in a proportion at least approximately one per cent by weight, and less than approximately ten per cent by weight, based on the finished coating composition.

CHARLES A. THOMAS.